United States Patent [19]

Amano et al.

[11] Patent Number: 5,448,004
[45] Date of Patent: Sep. 5, 1995

[54] PROCESS FOR PRODUCING VINYL CHLORIDE POLYMER

[75] Inventors: Tadashi Amano, Kawasaki; Shigehiro Hoshida, Ibaraki, both of Japan

[73] Assignee: Shin-Etsu Chemical Co., Ltd., Tokyo, Japan

[21] Appl. No.: 770,774

[22] Filed: Oct. 4, 1991

Related U.S. Application Data

[63] Continuation of Ser. No. 508,279, Apr. 12, 1990, abandoned.

[30] Foreign Application Priority Data

Apr. 14, 1989 [JP] Japan ................................ 1-94917

[51] Int. Cl.⁶ ..................... C08F 2/20; C08F 214/06
[52] U.S. Cl. ............................. 526/202; 526/321; 526/340; 526/340.1; 526/344; 526/344.2; 526/345
[58] Field of Search ............... 526/202, 338, 344, 345, 526/321

[56] References Cited

U.S. PATENT DOCUMENTS

| | | | |
|---|---|---|---|
| 3,166,534 | 1/1965 | Perrins | 526/318 |
| 3,763,123 | 10/1973 | Waterman | 526/338 |
| 4,816,539 | 3/1989 | Watanabe | 526/320 |
| 4,910,273 | 3/1990 | Amano | 526/202 |

*Primary Examiner*—Fred Zitomer
*Attorney, Agent, or Firm*—McAulay Fisher Nissen Goldberg & Kiel

[57] ABSTRACT

A process for producing a vinyl chloride polymer for matted moldings which comprises performing the suspension polymerization of vinyl chloride monomer or a mixture of vinyl monomers composed mainly of vinyl chloride in an aqueous medium, said suspension polymerization being performed after the addition of a dispersion obtained by dispersing a polyfunctional monomer having 2 or more ethylenic double bonds in the molecule into a solution containing a partially saponified polyvinyl alcohol having a degree of saponification of 25 to 65 mole % and an average degree of polymerization of 150 to 1000, thereby yielding a vinyl chloride resin composed of 5 to 90 wt % tetrahydrofuran-insoluble gel fraction, with the remainder being tetrahyrofuran-solubles.

9 Claims, No Drawings

PROCESS FOR PRODUCING VINYL CHLORIDE POLYMER

This is a continuation of application Ser. No. 508,279, filed Apr. 12, 1990 now abandoned.

BACKGROUND OF THE INVENTION

1. Field of the Invention

The present invention relates to a process for producing a vinyl chloride polymer for matted moldings by suspension polymerization. More particularly, it is concerned with a process for producing a vinyl chloride polymer as a molding material suitable for high-quality matted products, said process being possible owing to the improvement in the method of charging a polyfunctional monomer.

2. Description of the Prior Art

It is known that the production of a vinyl chloride polymer for matted moldings by suspension polymerization in an aqueous medium is accomplished by the addition of a cross-linking agent which is a polyfunctional monomer having 2 or more ethylenic double bonds in the molecule. The charging of such a polyfunctional monomer into the suspension system may be made batchwise before polymerization or intermittently or continuously during polymerization. In either case, the polyfunctional monomer is added as such or after dilution with a solvent such as toluene, benzene and the like, for the control of insoluble gel content.

The conventional process mentioned above, however, gives rise to a vinyl chloride polymer for matted moldings which contains a large number of fisheyes and is poor in processability.

With the recent expansion of their applications, there has arisen a strict requirement for the quality of vinyl chloride polymers for matted moldings. It is desirable that the vinyl chloride polymer for film and sheet should contain as few fish-eyes as possible, and have good processability.

SUMMARY OF THE INVENTION

The present invention was completed to meet the above-mentioned requirements. Accordingly, it is an object of the present invention to provide a process for producing a vinyl chloride polymer for highquality matted moldings with a minimum of fish-eyes.

To achieve this object, the present inventors carried out a series of researches which led to the finding that it is possible to produce a vinyl chloride polymer for matted moldings with a minimum of fish-eyes by the process which comprises performing the suspension polymerization of vinyl chloride monomer or a mixture of vinyl monomers composed mainly of vinyl chloride in an aqueous medium, said suspension polymerization being performed after the addition of dispersion obtained by dispersing a polyfunctional monomer having 2 or more ethylenic double bonds in the molecule into a solution containing a partially saponified polyvinyl alcohol having a degree of saponification of 25 to 65 mole % and an average degree of polymerization of 150 to 1000, thereby yielding a vinyl chloride resin composed of 5 to 90% by weight of tetrahydrofuran-insoluble gel fraction, with the remainder being tetrahyrofuransolubles.

The results of the present inventors' investigation revealed that the vinyl chloride polymer for matted moldings obtained by the conventional process mentioned above contains a large number of fish-eyes and is poor in absorption of plasticizer because the polyfunctional monomer as a crosslinking agent is charged as such or after dilution with a solvent such as toluene, benzene and the like and hence it does not disperse well into the suspension system. To achieve the improved dispersion of the polyfunctional monomer into the suspension system, the present inventors continued their investigation, which led to the finding that the polyfunctional monomer can be dispersed uniformly into the polymerization system if it is charged into the system in the form of dispersion in a solution containing partially saponified polyvinyl alcohol having a degree of saponification of 25 to 65 mole % and an average polymerization degree of 150 to 1000, and that the polyfunctional monomer charged in this manner brings about the uniform crosslinking reaction, giving rise to a vinyl chloride polymer for matted moldings containing a minimum of fish-eyes and being capable of absorbing a plasticizer well. The present invention was completed on the basis of this finding.

Incidentally, the term "tetrahydrofuran-insoluble gel fraction" means the gel fraction insoluble in tetrahydrofuran which is measured by the method given in Example explained later. The term "tetrahydrofuransolubles" means any remaining fraction which is soluble in tetrahydrofuran.

DETAILED DESCRIPTION OF THE INVENTION

According to the process of the present invention, a vinyl chloride polymer for matted moldings is produced by suspension polymerization in an aqueous medium from a vinyl chloride monomer or a mixture of vinyl monomers composed mainly of vinyl chloride and a polyfunctional monomer having 2 or more ethylenic double bonds in the molecule, said polyfunctional monomer being added in the form of a dispersion obtained by dispersing said polyfunctional monomer into a solution containing partially saponified polyvinyl alcohol having a degree of saponification of 25 to 65 mole % and an average degree of polymerization of 150 to 1000.

The dispersion of a polyfunctional monomer should contain a partially saponified polyvinyl alcohol, which should have a degree of saponification of 25 to 65 mole %, preferably 35 to 55 mole %. With a degree of saponification lower than 25 mole %, the partially saponified polyvinyl alcohol has such a low watersolubility that it does not disperse the polyfunctional monomer thoroughly. With a degree of saponification higher than 65 mole %, the partially saponified polyvinyl alcohol has an adverse effect on the polymerization, resulting in a vinyl chloride polymer of low quality containing a large number of fish-eyes.

The partially saponified polyvinyl alcohol should also have an average degree of polymerization of 150 to 1000, preferably 150 to 600. With an average degree of polymerization lower than 150, the resulting polymer has a broader particle size distribution. With an average degree of polymerization higher than 1000, the resulting polymer has low porosity.

The solvent for dissolving the partially saponified polyvinyl alcohol and dispersing the polyfunctional monomer is water, an organic solvent or mixtures thereof. Examples of the organic solvent include alcohols having 1 to 5 carbon atoms such as methanol, ethanol, propanol, 1-butanol, 2-butanol, 2-methyl-1-propanol, 2-methyl-2-propanol, 3-methyl-1-butanol, 2-methyl-2-butanol, isopropanol, 2-pentanol and the like; ketones having 3 to 6 carbon atoms such as acetone, methyl ethyl ketone, methy isobuthyl ketone and the like; esters having 2 to 6 carbon atoms such as methyl formate, ethyl formate, methyl acetate, n-buthyl acetate, ethyl acetoacetate and the like; ethers such as 4-methyl-1,3-dioxolan, ethylene glycol diethylether and the like; furans such as furan, dimethylfuran and the like; dimethylformamide; dimethyl sulfoxide; acetonitrile; and derivatives thereof. Among them, water and alcohols are preferred. The solvents may be used singly or in combination. In case of using a mixed solvent of water and an organic solvent, the mixing weight ratio of water and the organic solvent may 9/1 to 0/10, preferably 5/5 to 2/8.

The concentration of the partially saponified polyvinyl alcohol in the dispersion should be 0.0001 to 70% by weight, preferably 0.01 to 50% by weight. With a concentration lower than 0.0001% by weight, the solution of partially saponified polyvinyl alcohol is poor in ability to disperse the polyfunctional monomer. With a concentration higher than 70% by weight, the dispersion has an adverse effect on the suspension polymerization of vinyl chloride monomer, with the result that the formation of polymer particles become uncontrollable and the aqueous dispersion becomes too viscous for pumping.

The dispersion of a polyfunctional monomer into a solvent in which the partially saponified polyvinyl alcohol has been dissolved may be accomplished by homogenizing or mixing the polyfunctional monomer as such or in the form of solution of a desired concentration (preferably 5 to 15 wt %) in an adequate solvent such as the above exemplified solvents. The concentration of the polyfunctional monomer in the dispersion should be 10 to 90% by weight, preferably 30 to 80 wt %. With a concentration lower than 10% by weight, the dispersion of the polyfunctional monommer is uneconomically voluminous (requiring the installation of a larage tank). With a concentration higher than 90% by weight, the dispersion of the polyfunctional monomer is too viscous for pumping. The dispersion prepared in this manner should be stirred occasionally to ensure uniform dispersion after preparation and before addition.

It is essential to uniformly disperse the polyfunctional monomer into the solution or solvent in which the partially saponified polyvinyl alcohol is dissolved. The dispersion is a kind of oil-in-water (O/W) type dispersion in which the partially saponified polyvinyl alcohol solution is the continuous phase and the polyfunctional monomer is the discontinuous phase. It is preferably that an average particle size of the polyfunctional monomer dispersed in the O/W type dispersion is 20 $\mu$m or less, more preferably 5 $\mu$m or less. The lower limit of the average particle size may be generally 0.01 $\mu$m.

The polyfunctional monomer used in the present invention is a compound having 2 or more ethylenic double bonds in the molecule. Examples of such a compound are listed below.

a) Diallyl esters of phthalic acid, such as diallyl isophthalate and diallyl terephthalate.
b) Diallyl esters and diviny esters of an ethylenically unsaturated dibasic acid, such as diallyl maleate, diallyl fumarate, diallyl itaconate, divinyl itaconate, and divinyl fumarate.
c) Diallyl esters and divinyl esters of a saturated dibasic acid, such as diallyl adipate, divinyl adipate, diallyl azelate, and diallyl sebacate,
d) Divinyl ethers such as diallyl ether, triallyl cyanurate, triallyl isocyanurate, triallyl trimellitate, ethylene glycol divinyl ether, n-butanediol divinyl ether, and octadecane divinyl ether.
f) Diacrylic esters and dimethacrylic esters of polyhydric alcohols, such as ethylene glycol dimethacrylate, diethylene glycol dimethacrylate, triethylene glycol diacrylate, and polyethylene glycol diacrylate.
g) Triacrylic esters and trimethacrylic esters of polyhydric alcohols, such as trimethylolpropane trimethacrylate, trimethylolethane trimethacrylate, trimethylolpropane triacrylate, trimethylolethane triacrylate, and tetramethylolmethane triacrylate.
h) Unsaturated bond-containing low-molecular weight polymers (having a molecular weight of 500 to 3000), such as bismethacryloyloxyethylene phthalate, 1,3,5-triacryloylhexahydrotriazine, and 1,2-butadiene homopolymer.

These polyfunctional monomers may be used alone or in combination with one another.

According to the process of the present invention, the polyfunctional monomer is added in the form of a dispersion as mentioned above to the suspension system of vinyl chloride monomer or a vinyl monomer mixture composed mainly of vinyl chloride.

The polyfunctional monomer having two or more ethylenic double bonds in the molecule should be used in an amount of 0.01 to 3 parts by weight, preferably 0.1 to 1 part by weight, for 100 parts by weight of vinyl chloride or a mixture of vinyl monomers composed mainly of vinyl chloride. With an amount less than 0.01 part, the polyfunctional monomer does not produce the matting effect as desired. With an amount in excess of 3 parts by weight, the polyfunctional monomer gives rise to a polymer which is poor in processability.

The polyfunctional monomer may be added to the polymerization system at any time. For example, it may be added all at once before the start of polymerization; it may be added partly before the start of polymerization, with the remainder being added in portions during polymerization; or it may be added in portions or continuously during polymerization.

The vinyl chloride polymer for matted moldings is prepared from vinyl chloride or a mixture of vinyl chloride (more than 50 wt %) and a copolymerizable vinyl monomer (or comonomer). Examples of the comonomer include vinyl esters such as vinyl acetate and vinyl propionate; acrylic esters and methacrylic esters such as methyl acrylate and ethyl acrylate; olefins such as ethylene and propylene; maleic anhydride; acrylonitrile; styrene; vinylidene chloride; and any other monomers copolymerizable with vinyl chloride.

According to the process of the present invention, the above-mentioned monomers undergo suspension polymerization in an aqueous medium. The aqueous medium may contain dispersing agents which are commonly used for the polymerization of vinyl chloride in an aqueous medium. Examples of the dispersing agents include water-soluble celluloses such as methyl celluloses hydroxyethyl celluloses and hydroxypropyl methl cellulose; water-soluble partially saponified polyvinyl alcohols having a degree of saponification of 75 to 99 mole % and an average degree of polymerization of 1500 to 2700; acrylic acid polymers; water-soluble polymers such as gelatin; oil-soluble emulsifiers such as sorbitan monolaurate, sorbitan trioleate, glycerin tristearate, and ethyleneoxide-propyleneoxide block copolymers; and water-soluble emulsifiers such as polyoxyethylene sorbitan monolaurate, polyoxyethylene glycerin oleate, and sodium laurate. They may be used alone or in combination with one another.

The blending amount of the dispersing agent should preferably be in the range of 0.01 to 1 part by weight per 100 parts by weight of vinyl chloride or the mixture of vinyl monomers.

According to the process of the present invention, the polymerization may be initiated by any polymerization initiator which is commonly used for the polymerization of vinyl chloride. Examples of the polymerization initiator include percarbonate compounds such as diisopropyl peroxydicarbonate, di-2-ethylhexyl peroxydicarbonate, and diethoxyethyl peroxydicarbonate; perester compounds such as t-butyl peroxypivalate, t-hexyl peroxypivalate, t-butyl peroxyneodecanate, and α-cumyl peroxyneodecanate; peroxides such as acetylcyclohexyl sulfonyl peroxide, 2,4,4-trimethylpentyl-2-peroxyphenoxy acetate, and 3,5,5-trimethyl hexanoyl peroxide; azo compounds such as azobis-2,4-dimethyl-valeronitrile and azobis (4-methoxy-2,4-dimethyl valeronitrile); and potassium persulfate, ammonium persulfate, and hydrogen peroxide. They may be used alone or in combination with one another.

The blending amount of the polymerization initiator should preferably be in the range of 0.01 to 1 part by weight per 100 parts by weight of vinyl chloride or the mixture of vinyl monomers.

The polymerization system may contain optional polymerization regulator, chain transfer agent, pH regulator, gelation improver, antistatic agent, antioxidant, and scale inhibitor, according to need.

According to the process of the present invention, the polymerization may be performed under the same conditions as the ordinary polymerization of vinyl chloride. In other words no specific restrictions are imposed on the method of charging the polymerizer with the aqueous medium, vinyl chloride monomer, optional comonomers, dispersing agent, and polymerization initiator. The polymerization temperature is usually 20° to 80° C., which is common for the ordinary polymerization of vinyl chloride.

The vinyl chloride polymer for matted moldings should contain 5 to 90% by weight, preferably 10 to 50% by weight, of tetrahydrofuran-insoluble gel fraction, with the remainder being tetrahydrofuran-solubles. With gel fraction less than 5% by weight, the vinyl chloride polymer yields moldings with a poor matted surface. With gel fraction in excess of 90% by weight, the vinyl chloride polymer is poor in processability.

The vinyl chloride polymer for matted moldings which is obtained as mentioned above is of high quality with a minimum of fish-eyes. It may be used alone or in combination with other thermoplastic resin or rubber (such as vinyl chloride resin, polyethylene, ABS resin, urethane resin, acrylic resin, acrylonitrile-butadiene rubber (NBR), and chloroprene rubber (CR)) and an optional processing aid such as a plasticizer, to produce matted moldings, especially high-quality film and sheet.

As mentioned above, the process of the present invention prevents the formation of fish-eyes during polymerization, thereby giving rise to a high-quality vinyl chloride resin for matted moldings with a minimum of fish-eyes.

The invention will be described in more detail with reference to the following examples and comparative examples, which are not intended to restrict the scope of the invention.

EXAMPLES 1 TO 5

A 100-liter stainless steel polymerizer was charged with 60 kg of deionized water, 30 g of water-soluble partially saponified polyvinyl alcohol having a degree of saponification of 80 mole % and an average degree of polymerization of 2000, 15 g of di-2-ethylhexyl peroxydicarbonate, and an aqueous dispersion as specified in Table 1.

The aqueous dispersion used is one obtained by dissolving a partially saponified polyvinyl alcohol having a degree of saponification of 48 mole % and an average degree of polymerization of 250 into a mixture of water and methanol at a weight ratio shown in Table 1, adding a polyfunctional monomer shown in Table 1, and uniformly dispersing the monomer into the solution of the partially saponified polyvinyl alcohol at 50° C. using a homogenizer. The average particle size of the polyfunctional monomer in the dispersion (aqueous medium) was measured. The results are also shown in Table 1.

TABLE 1

| | Aqueous dispersion | | | | | Average particle size of polyfunctional monomer in the dispersion |
|---|---|---|---|---|---|---|
| | Partially saponified PVA | Aqueous liquid | | Polyfunctional monomer | | |
| Example No. | Amount (g) | Water/methanol (weight ratio) | Amount (g) | Name | Amount (g) | |
| 1 | 30 | 6/1 | 270 | Diallyl phthalate | 90 | 25 |
| 2 | 30 | 3/1 | 270 | Diallyl phthalate | 90 | 10 |
| 3 | 30 | 1/1 | 270 | Diallyl phthalate | 90 | 2 |
| 4 | 30 | 1/3 | 270 | Diallyl phthalate | 150 | 1 |
| 5 | 30 | 1/1 | 270 | 1,6-hexaglycol diacrylate | 150 | 3 |

The polymerizer was evacuated to 100 mmHg and then charged with 30 kg of vinyl chloride monomer. The contents in the polymerizer were heated to 62° C. with stirring by supplying the jacket with hot water. Polymerization was continued at this temperature. When the pressure in the polymerizer dropped to 6.0 kg/cm$^2$G, the polymerization was suspended and the unreacted monomer was recovered. The polymer slurry was discharged from the polymerizer, followed by dehydration and drying. Thus there was obtained a vinyl chloride polymer.

COMPARATIVE EXAMPLE 1

The same procedure as in Example 2 was repeated to yield a vinyl chloride polymer, except that 90 g of diallyl phthalate was added instead of the aqueous dispersion containing the partially saponified polyvinyl alcohol having a degree of saponification of 48 mole % and an average degree of polymerization of 250 and diallyl phthalate.

COMPARATIVE EXAMPLE 2

The same procedure as in Example 2 was repeated to yield a vinyl chloride polymer, except that 90 g of diallyl phthalate and a solution obtained by dissolving 30 g of a partially saponified polyvinyl alcohol having a degree of saponification of 48 mol % and an average degree of polymerization of 250 into 270 g of a mixture of water and methanol at a weight ratio of 1:1 and were added separately (i.e. without dispersing diallyl phthalate to said solution) instead of the aqueous dispersion containing the partially saponified polyvinyl alcohol having a degree of saponification of 48 mole % and an average degree of polymerization of 250 and diallyl phthalate.

COMPARATIVE EXAMPLE 3

The same procedure as in Example 2 was repeated to yield a vinyl chloride polymer, except that a solution obtained by dissolving a partially saponified polyvinyl alcohol having a degree of saponification of 90 mole % and an average degree of polymerization of 2000 into a mixture of water and methanol at a weight ratio of 3:1 and adding diallyl phthalate to disperse it to the solution of the partially saponified polyvinyl alcohol is used instead of the aqueous dispersion containing the partially saponified polyvinyl alcohol having a degree of saponification of 48 mole % and an average degree of polymerization of 250 and diallyl phthalate.

The average particle size of diallyl phthalate in the dispersion obtained above was 40 μm.

The vinyl chloride polymers obtained in Examples and Comparative Examples were tested for fish-eyes, plasticizer absorption, and tetrahydrofuran-insoluble gel fraction in the following manner.

Fish-eyes

Each sample was compounded according to the following formulation.

| | |
|---|---|
| Vinyl chloride polymer obtained above | 50.0 parts by weight |
| Vinyl chloride homopolymer* | 50.0 parts by weight |
| DOP (dioctyl phthalate) | 30.0 parts by weight |
| Tribasic lead sulfate | 0.5 parts by weight |
| Lead stearate | 1.5 parts by weight |
| Titanium oxide | 0.5 parts by weight |
| Carbon black | 0.05 parts by weight |

*TK-800 (suspension polymer) made by Shin-Etsu Chemical Co., Ltd., tetrahydrofuran-insoluble gel fraction 0%, average degree of polymerization 800.

The resulting compound (25 g) was mixed at 145° C. for 5 minutes on a 6″ mixing roll, and then formed into a sheet, 10 cm wide and 0.2 mm thick. This sheet was examined to count the number of transparent particles per 100 cm². The counted number was used as an index of fish-eyes.

Absorption of Plasticizer

Ten grams of each of the vinyl chloride polymer was allowed to stand for 1 hour in contact with 20 g of DOP. After centrifugal removal of unabsorbed DOP, the amount (wt %) of DOP absorbed by tile vinyl chloride polymer was calculated.

Tetrahydrofuran-Insoluble Gel Fraction

The vinyl chloride polymer (1 g) was dissolved with stirring in 100 ml of tetrahydrofuran (THF) at 60° C. The resulting solution was allowed to stand for 24 hours, and the supernatant liquid (10 ml) was collected. After evaporation to dryness, the residue (polymer) was weighed, and the amount of THF-insoluble gel fraction was calculated according to the following formula.

THF-insoluble gel fraction (wt %) =

$$100 - \frac{\text{Residue (g)} \times 10}{1 \text{ (g)}} \times 100$$

The results are shown in Table 2.

TABLE 2

| | Fish-eyes | Plasticizer absorbed (wt %) | THF-insoluble gel (wt %) |
|---|---|---|---|
| Example | | | |
| 1 | 15 | 26.0 | 22 |
| 2 | 10 | 25.4 | 21 |
| 3 | 3 | 25.0 | 20 |
| 4 | 2 | 26.5 | 25 |
| 5 | 4 | 26.3 | 24 |
| Comparative Example | | | |
| 1 | 30 | 23.2 | 21 |
| 2 | 25 | 22.0 | 23 |
| 3 | 26 | 22.8 | 20 |

What is claimed is:

1. A process for producing a vinyl chloride polymer for matted moldings which comprises performing a suspension polymerization of vinyl chloride monomer or a mixture of vinyl monomers composed of more than 50 wt. % vinyl chloride in an aqueous medium containing; a dispersing agent selected from the group consisting of water-soluble celluloses, water-soluble partially saponified polyvinyl alcohols, acrylic acid polymers, gelatin, oil-soluble emulsifiers and water-soluble emulsifiers, preparing separately from the aqueous medium an aqueous dispersion by dispersing a polyfunctional monomer having 2 or more ethylenic double bonds in the molecule into a solution of a partially saponified polyvinyl alcohol having a degree of saponification of 25 to 65 mole % and an average degree of polymerization of 150 to 1000, in a solvent of water and an alcohol having 1 to 5 carbon atoms in a ratio of from 1:1 to 1:4, and adding said aqueous dispersion to said aqueous medium to perform a suspension polymerization, thereby yielding a vinyl chloride resin composed of 5 to 90% by weight of tetrahydrofuran-insoluble gel fraction, with the remainder being tetrahydrofuran solubles.

2. The process of claim 1 wherein the amount of the partially saponified polyvinyl alcohol in the aqueous dispersion is in the range of 0.0001 to 70% by weight.

3. The process of claim 1 wherein the amount of the polyfunctional monomer in the dispersion is in the aqueous range of 10 to 90% by weight.

4. The process of claim 1 wherein the polyfunctional monomer is used in an amount of 0. 1 to 3 parts by weight for 100 parts by weight of said vinyl chloride monomer or mixture of vinyl monomers.

5. The process of claim 1 wherein the polyfunctional monomer is dispersed with an average particle size of 20 μm or less in the dispersion.

6. The method of claim 1 wherein the organic solvent is selected from the group consisting of methanol, ethanol, propanol, 1-butanol,. 2-butanol, 2-methyl-1-propanol, 2-methyl-2-propanol, 3-methyl-1-butanol, 2-methyl-2butanol, isopropanol, and 2-pentanol.

7. A process for producing a vinyl chloride polymer for matted moldings which comprises performing a suspension polymerization of vinyl chloride monomer or a mixture of vinyl monomers composed of greater than 50% by weight of vinyl chloride in an aqueous medium containing a dispersing agent selected from the group consisting of water-soluble celluloses, water-soluble partially saponified polyvinyl alcohols having a degree of saponification of 75 to 99 mol % and an average degree of polymerization of 1500 to 2700, acrylic acid polymers, gelation, oil-soluble emulsifiers and water-soluble emulsifiers, preparing separately from the aqueous medium an aqueous dispersion by dispersing a polyfunctional monomer having 1 or more ethylenic double bonds in the molecule selected from the group consisting of diallyl esters of phthalic acid, diallyl esters and divinyl esters of an ethylenically unsaturated dibasic acid, diallyl esters and divinyl esters of a saturated dibasic acid, divinyl esters, diacrylic esters and dimethacrylic esters of polyhydric alcohols, triacrylic esters and trimethacrylic esters of polyhydric alcohols, and unsaturated bond-containing low-molecular weight polymers into a solution of a partially saponified polyvinyl alcohol having a degree of saponification of 35 to 55 mol % and an average degree of polymerization of 150 to 1000, in a solvent of water and an alcohol having 1 to 5 carbon atoms in a ratio of from 1:1 to 1:4, and adding said aqueous dispersion to said aqueous medium to perform a suspension polymerization, thereby yielding a vinyl chloride resin composed of 5 to 90% by weight of tetrahydrofuran-insoluble gel fraction, with the remainder being tetrahydrofuran solubles.

8. The process of claim 7 wherein the polyfunctional monomer having 2 or more ethylenic double bonds in the molecule is at least one selected from the group consisting of diallyl esters of phthalic acid, and diacrylic esters and dimethacrylic esters of polyhydric alcohols.

9. The process of claim 8 wherein the polyfunctional monomer having 2 or more ethylenic double bonds in the molecule is diallyl phthalate, 1,6-hexaglycol diacrylate or 1,6-hexaglycol dimethacrylate.

* * * * *